United States Patent Office 3,274,207
Patented Sept. 20, 1966

3,274,207
PROCESSES FOR PREPARING THIAZOLE
CARBOXYLIC ACIDS
Janos Kollonitsch, Westfield, N.J., assignor to Merck &
Co., Inc., Rahway, N.J., a corporation of New Jersey
No Drawing. Filed Oct. 2, 1961, Ser. No. 142,000
7 Claims. (Cl. 260—302)

This invention relates to an improved method for preparing carboxylic acids. More particularly, it relates to a method for obtaining a thiazole carboxylic acid from the corresponding haloalkyl substituted thiazole.

Attempts have been previously made at effecting the conversion of a haloalkyl substituted thiazole to the corresponding carboxylic acid compound. These attempts have not been entirely satisfactory however, in that the methods employed are usually characterized by the need for expensive reagents and result in unsatisfactory yields of the desired product. An improved method of obtaining the carboxylic acids referred to is desired in view of the fact that they are useful as intermediates in a variety of organic syntheses. It is one object of the present invention to provide economical processes for producing thiazole carboxylic acids. It is another object of the present invention to provide processes for obtaining high yields of a thiazole carboxylic acid from the corresponding halomethyl compound. Another object is the provision of thiazole aldehydes and hydroxymethylthiazoles which are useful as intermediates in a new process for preparing thiazole carboxylic acids. These and further objects will become more apparent when consideration is given to the following detailed disclosure.

In accordance with the present invention, thiazole carboxylic acids can be obtained from the corresponding halomethylthiazoles by processes which may be depicted structurally as follows:

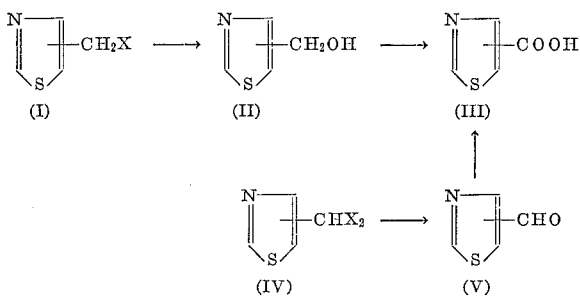

wherein X is chlorine or bromine. The halomethyl substituent, may be attached to any carbon atom of the thiazole ring, i.e. at the 2, 4 or 5 position thereof. Illustrative of the compounds which may be produced are thiazole-2-carboxylic acid, thiazole-4-carboxylic acid, thiazole-5-carboxylic acid, and the corresponding hydroxymethyl and aldehydo precursors thereof. When carried out in the manner hereinafter specified, the method of the present invention allows these compounds to be obtained in yields generally in excess of 65%.

According to one aspect of the present invention, a monohalomethylthiazole I is converted to the corresponding hydroxymethylthiazole II by contacting the halo compound with a strong acid in an aqueous medium. Illustrative of the acids which may be used for this purpose are halogen acids such as hydrochloric and hydrobromic acids, sulfuric acid, and phosphoric acid. When a halogen acid is used, the reaction yielding compound II from compound I is a reversible one, the yield of the hydroxymethyl compound being adversely affected when a large excess of halogen acid is used. It is desirable therefore, when halogen acids are used, to restrict the amount thereof to less than 4 moles and preferably to between 1–2 moles, per mole of halomethyl compound. Amounts of halogen acids as low as 0.1 mole per mole of halomethylthiazole may be used however, and suitable results will be obtained. When the acid does not contain a halogen atom as its anion, the amount used is not critical and is limited only by economical considerations. The preferred range for these other acids however is between 1–3 moles per mole of the halomethyl compound although amounts as low as 0.1 mole per mole of halomethylthiazole may be used. The amount of water used in the reaction is not critical and may be present to the extent desired for convenient handling of the solution.

The conditions of reaction time, temperature and pressure employed in carrying out the first step of the process are interrelated to a certain degree. For example, the reaction may be carried to completion at elevated pressures and temperatures, of about 75 p.s.i.g. and 160° C. respectively, in a matter of a few hours. Alternatively, atmospheric pressure and somewhat lower temperatures may be employed and will cause the reaction to go to completion in a longer period of time. The ultimate selection of the combinations of these variables will therefore be determined by individual requirements and preferences based on the availability of pressure equipment, for example, and the economics involved in longer reaction times. Particularly good results are obtained however, when the reaction is run at pressures between 40 and 60 p.s.i.g. and at temperatures in the range of 120° C. to 140° C. The increased pressure may be achieved in suitable pressure type equiment, by allowing gaseous reaction by-products to accumulate therein.

The hydroxymethylthiazole II is obtained in the reaction mass as the addition salt corresponding to the particular acid employed in the conversion. It may then be directly oxidized to thiazole carboxylic acid without isolation or alternatively may be isolated and subsequently oxidized. When the first step has been carried out utilizing sulfuric acid as the hydrolyzing agent, it is preferred to perform the oxidation of the second step in situ, inasmuch as sulfuric acid is employed in the second step, as will be described more fully hereinbelow. Where however, the initial step is carried out with some other acid, it is preferred to isolate the hydroxymethyl compound and oxidize it subsequently. This is particularly true when the acid used in the hydrolysis is incompatible with the oxidizing agent used in the second step. Isolation of the hydroxymethyl compound may be accomplished by means well known in the art, as for example, by alkalizing the addition salt and then extracting the hydroxymethylthiazole with a water-immiscible solvent such as, for example butanol and higher alkanols, and esters of lower alkyl acids such as ethyl acetate.

In the second step of this process the hydroxymethylthiazole compound II is converted to the corresponding thiazole carboxylic acid III by oxidation with nitric acid in the presence of sulfuric acid. It has been discovered that when this mixture is used as the oxidizing agent, the carboxylic acid is obtained in yields generally exceeding 90%. Maximum yields are obtained when the sulfuric acid is present to the extent of about 0.1 to 3 moles sulfuric acid per mole nitric acid. It should be understood however that amounts in excess of those indicated may be used without detrimentally affecting the yield of the final product, the upper limit being dictated by considerations of economic feasibility. It has been found convenient to use 1–6 moles of nitric acid per mole of the hydroxymethylthiazole, with the preferred range being between 2–3 moles of nitric acid per mole of hydroxymethyl compound.

The temperature at which this step of the method of the present invention is carried out is not unduly critical. In general, higher temperatures favor decreased reaction times. It will be appreciated however that excessive temperatures, wherein thermal decomposition of the starting material or of any product is a likelihood, should be avoided. It has been found convenient to use temperatures in the range of 50–120° C. and preferably 65°–90° C. with the reaction going to completion in about 3–5 hours. The carboxylic acids are obtained in this step as the free acid, and may be precipitated from the reaction solution by adjusting the pH thereof to a level at which the solubility of the acids is the lowest. The actual pH favoring maximum insolubility will, of course, depend on the particular carboxylic acid produced. In general, however, a pH in the range of from about 1.5–2.5 is suitable.

In accordance with another aspect of the invention, the thiazole carboxylic acids III are obtained from dihalomethylthiazoles IV via conversion of the dihalomethyl compound to a thiazole aldehyde V with subsequent oxidation of the thiazole aldehyde to the carboxylic acid. The preferred method for obtaining the carboxylic acid contemplates effecting the hydrolysis of the dihalomethyl compound IV with concurrent separation of the halogen acid formed thereby from the resulting aldehyde V, and converting the aldehyde in situ to the final product III. With regard to the hydrolysis, such strong acids as sulfuric acid and phosphoric acid are particularly suitable. Sulfuric acid however is preferred, inasmuch as the subsequent oxidation of the thiazole aldehyde requires the presence of sulfuric acid. The separation of the aldehyde from the halogen acid, formed as a by-product of the hydrolysis, may be effected, for example, by steam distillation.

The actual amounts of acid and water supplied to the reaction system are not critical, and each may be present in a quantity sufficient to allow convenient handling of the solution. Good results, however, are achieved when the acid is present to the extent of 0.1–5 moles thereof per mole dihalomethylthiazole and constitutes from 6% to 90% by volume of the solution.

The temperatures which may be utilized in practicing the presently described aspect of this invention will generally vary according to the composition of the reaction solution. In general, temperatures in the range of 50–200° C. are suitable. The preferred range however is between 100 and 150° C.

As a result of carrying out the above described hydrolysis, the dihalomethyl compound IV is converted to the corresponding aldehyde V which is obtained as the free compound itself dissolved in the reaction mass. In the preferred method of this aspect of the invention, the aldehyde is then treated in situ according to the oxidation step hereinafter described to obtain the carboxylic acid III. Where it is desired to isolate the aldehyde, techniques well known in the art may be applied to facilitate isolation. For example, the pH of the reaction system may be adjusted to a value favoring minimum solubility of the aldehyde, which may then be extracted in a water-immiscible solvent such as chloroform, butanol, alkyl esters such as ethyl acetate and the like.

The thiazole-aldehyde V is converted to the thiazole carboxylic acid III by oxidation using a mixture of nitric acid and sulfuric acid as the oxidizing agent. Yields of the carboxylic acid generally exceed 85%. Maximum effect on the yield is obtained when the sulfuric acid is present in the oxidizing system to the extent of about 0.1–3 moles of sulfuric acid per mole of nitric acid. The upper limit of this range, however, is not critical and any value which is convenient may be selected. With regard to the amount of nitric acid used it is convenient to employ a range of 1–4 moles per mole of thiazole aldehyde.

It is preferred to carry out the oxidation at elevated temperatures such as the reflux temperature of the reaction mass. Temperatures in the range of 60–95° C. are suitable with the preferred range being between 80–95° C.

The thiazole carboxylic acid is obtained as the free acid in the reaction mass. In order to facilitate its recovery, it is desirable to adjust the pH of the solution to a value favoring minimum solubility. The particular pH selected will be largely determined by the particular carboxylic acid being produced. Values in the range of 1.5–2.5 are representative of those which characterize minimum solubility.

The method of the present invention yields thiazole acids which are useful in many applications. They may be converted to acid halides, nitriles and the like for use in a wide variety of chemical syntheses. In addition the thiazole carboxylic acids are intermediates in a synthesis of 2-thiazolyl benzimidazoles, which latter compounds are highly active anthelmintic agents.

The following examples are given for purposes of illustration only and are in no way to be construed as limiting the scope of the present invention.

EXAMPLE I

*4-hydroxymethylthiazole*

33.8 g. of 4-chloromethylthiazole are added to a mixture of 110 ml. of water and 51.5 g. of sulfuric acid and the mixture heated in a Hastalloy autoclave at 130° C. for 6 hours. The pressure rises to about 50 p.s.i.g. The reaction mass is then cooled and alkalized by the addition of about 100 ml. of 50% sodium hydroxide solution and then extracted with 60 ml. of secondary butanol at about 70° C. It is then extracted with 4 x 30 ml. of butanol. The combined butanol extracts are dried over magnesium sulfate and then the butanol is distilled off at atmospheric pressure. The resulting residue is distilled at 2 mm. pressure and 85–87° C. and yields 24.7 g. 4-hydroxymethylthiazole, corresponding to an 87% yield.

When the above procedure is repeated using a reaction temperature of 108° C. and atmospheric pressure, the 4-hydroxymethylthiazole is obtained in similarly high yield.

When the above procedure is repeated using 4-bromomethylthiazole, 2-chloromethylthiazole, 2-bromomethylthiazole, 5-chloromethylthiazole or 5-bromomethylthiazole in place of the 4-chloromethylthiazole, the corresponding hydroxymethylthiazoles are obtained.

EXAMPLE II

*4-hydroxymethylthiazole*

184.8 g. of 4-chloromethylthiazole is added to a mixture of 120 ml. of concentrated hydrochloric acid and 780 ml. of water. After moderate refluxing for 15 hours, 560 g. of potassium carbonate is next added and the mixture extracted with 5 x 100 ml. of ethyl acetate. The organic extracts are combined, dried over magnesium sulfate and the solvent is distilled of in vacuo and the residue fractionated at 70–72° C. and 0.5 mm. pressure. 109 g. of 4-hydroxymethylthiazole, corresponding to 68.5% yield is obtained.

Similar results are obtained when the above procedure is repeated using hydrobromic acid in place of hydrochloric acid.

EXAMPLE III

*Thiazole-4-carboxylic acid*

2.31 g. of 4-hydroxymethylthiazole (0.02 g. mole) is added to a mixture of 6.22 g. of concentrated sulfuric acid and 3 g. of water. 4.35 g. of 70% nitric acid is next added thereto and the mixture refluxed at a bath temperature of 77° C. for 5 hours. A vigorous evolution of gas occurs initially, which subsequently subsides. A colorless clear solution results. At the conclusion of the reaction period the solution is diluted with 6 ml. of water. Concentrated ammonium hydroxide is added until the pH of the solution reaches 2. The solution is then cooled for 48 hours at −5° C. The resulting solid thiazole-4-carboxylic acid is filtered, washed with 5 x 1.5 ml. of cold water and then dried. The product, thiazole-4-carboxylic acid, weighs 2.44 g., M.P. 191° C. and is obtained in 94.5% yield.

When the above procedure is repeated using 2-hydroxymethylthiazole or 5-hydroxymethylthiazole in place of 4-hydroxymethylthiazole the corresponding thiazole 2 or 5 carboxylic acid is produced.

EXAMPLE IV

Thiazole-4-carboxylic acid 40.2 g. of 4-chloromethylthiazole are added to a mixture of 62 g. of concentrated sulfuric acid and 180 ml. of water and the mixture refluxed for 16 hours. The mixture is next concentrated to a total weight of 200 g. and 150 ml. of concentrated nitric acid are then added. The resulting solution is heated at 85° C. for 16 hours. The reaction mixture is then concentrated in vacuo to dryness and the residue dissolved in water. Concentrated ammonium hydroxide is added to the aqueous solution until the pH reaches 2. The resulting solution is cooled for 48 hours at −5° C. The solid is removed by filtration, washed with 5 x 1.5 ml. of cold water and then dried. The solid thiazole-4-carboxylic acid thus obtained weighs 25 g. and is obtained in 65% yield based on the 4-chloromethylthiazole.

When the above procedure is repeated using an equivalent amount of phosphoric acid in place of the sulfuric acid in the hydrolysis step and 62 g. of sulfuric acid added with the nitric acid for the oxidation step, similar results are obtained.

In like fashion, when 4-bromomethylthiazole, 2-chloromethylthiazole, 2-bromomethylthiazole, 5-chloromethylthiazole or 5-bromomethylthiazole is used in place of the 4-chloromethylthiazole, the corresponding thiazole 2, 4 or 5 carboxylic acid is produced.

EXAMPLE V

Thiazole-4-carboxylic acid 8.4 g. of 4-dichloromethylthiazole is added to a mixture of 12.9 g. of 90% sulfuric acid and 3 g. of water and the mixture heated at 125–130° C. with stirring for 35 minutes while steam is passed through it. 40 ml. of distillate is collected, containing 96% of the hydrochloric acid evolved. The residue is then cooled, and 3 g. of concentrated sulfuric acid and 8.7 ml. of concentrated nitric acid is added. The resulting mixture is heated under reflux for 16 hours at 85° C. The solution is cooled and concentrated ammonium hydroxide is added until the pH reaches about 2. After cooling the solution at 5° C. for 4 hours, thiazole-4-carboxylic acid precipitates. The product is filtered off, washed with ice cold water, and dried. 5.51 g. of pure thiazole-4-carboxylic acid is obtained, corresponding to a yield of 85.5% based on the 4-dichloromethylthiazole.

When this experiment is repeated using 4-dibromomethylthiazole, 2-dichloromethylthiazole, 2-dibromomethylthiazole, 5-dichloromethylthiazole or 5-dibromomethylthiazole in place of 4-dichloromethylthiazole, the corresponding thiazole 2, 4 or 5 carboxylic acid is obtained.

When an equivalent amount of phosphoric acid is used in the foregoing procedure as the hydrolyzing agent, in place of 12.9 g. of sulfuric acid, and 9.7 g. additional sulfuric acid is provided in admixture with the nitric acid in the oxidation step, similar results as above described are obtained.

EXAMPLE VI

Thiazole-4-aldehyde

A solution of 3.36 g. of 4-dichloromethylthiazole in 50 ml. of 10% sulfuric acid is refluxed under nitrogen at a temperature of 125 to 130° C. for 2 hours under a nitrogen atmosphere. The mixture is then cooled to room temperature and 10% sodium hydroxide solution is added until the pH of the solution reaches 6. The mixture is then extracted with 3 x 30 ml. of chloroform. The chloroform is next washed with water, dried over magnesium sulfate and evacuated to dryness in vacuo. 1.91 g. of 4-thiazole aldehyde, M.P. 65 to 67° C. is obtained, corresponding to a yield of 85%.

When this experiment is repeated using 4-dibromomethylthiazole, 2-dichloromethylthiazole, 2-dibromomethylthiazole, 5-dichloromethylthiazole or 5-dibromomethylthiazole in place of 4-dichloromethylthiazole, the corresponding thiazole 2, 4 or 5 aldehyde is obtained.

EXAMPLE VII

Thiazole-4-carboxylic acid 1.13 g. of thiazole-4-aldehyde is added to a mixture of 3.11 g. of concentrated sulfuric acid and 1.5 g. of water; 4.35 g. of 70% nitric acid is then added and the mixture refluxed at a bath temperature of 85–90° C. for 6 hours. It is then cooled to room temperature and the pH adjusted to 2 by addition of 11.5 ml. of concentrated ammonium hydroxide. The mass is cooled in ice water, and the resulting solid filtered and dried, to give 1.00 g. pure thiazole-4-carboxylic acid (78% of theoretical).

When the above procedure is repeated using thiazole-2-aldehyde or thiazole-5-aldehyde in place of thiazole-4-aldehyde, the corresponding thiazole-carboxylic acid is obtained.

EXAMPLE VIII

The following procedure is illustrative of a general method for halogenating methyl substituted thiazoles.

99 g. of 4-methylthiazole is dissolved in a mixture of 92 g. of 96% sulfuric acid and 95 g. of concentrated sulfuric acid containing 20% sulfur trioxide. 3.2 g. (2 ml.) of phosphorus trichloride is added and 3.0 g. of azo-bis-butyronitrile in 72 g. of 96% sulfuric acid is added to the mixture over a period of 12 hours with stirring at 85–90° C. During this time a stream of chlorine is continuously introduced into the reaction mixture. The mixture is then degassed in vacuo at 60° C., cooled and quenched by pouring over 300 g. of crushed ice. The quenched mixture is then extracted with 3 x 200 ml. of benzene. The benzene extracts are combined, backwashed with sodium bicarbonate solution, dried over magnesium sulfate, and the benzene evaporated in vacuo. The residue is distilled at 63–65° C. and 1 mm. pressure yielding, as the distillate 75 g. of 4-dichloromethylthiazole. The benzene extracted water layer is treated with concentrated ammonium hydroxide until the pH reaches 6.0, and the resulting oil extracted into benzene. The benzene extract is dried over magnesium sulfate and concentrated to dryness, and the residue fractionated at 50–51° C. and 1 mm. pressure. 61 g. of 4-chloromethylthiazole distills over.

The mixture of halomethylthiazole and dihalomethylthiazole obtained prior to the solvent extraction in the general method described above, may be treated directly in accordance with the method of the present invention, without the physical separation of the two compounds. The following procedure is illustrative of a method for treating the mixture:

The mixture of 4-chloromethylthiazole and 4-dichloromethylthiazole obtained according to the above procedure is degassed, and cooled as described above and then quenched by adding it to 500 ml. of water. The resulting mixture is then hydrolized by heating it at 130° C. for 6 hours in an autoclave. This mixture, containing thiazole-4-aldehyde and 4-hydroxymethylthiazole is next concentrated to a residual weight of 400 g. To this solution is added 60 g. of concentrated sulfuric acid and 200 ml. of 70% nitric acid and the resulting mixture heated for 5 hours at 85° C. After the reaction mass is cooled to 25° C., concentrated ammonium hydroxide is added until the pH reaches 2. The resulting solution is cooled at 0° C. for 3 hours and the product thiazole-4-carboxylic acid, precipitates. The solid is filtered, washed with cold water and dried. .84 g. of pure thiazole-4-carboxylic acid is obtained corresponding to a yield of 71% based on the 4-methyl thiazole consumed.

When the above procedure is followed using 2-methylthiazole or 5-methylthiazole in place of the 4-methylthiazole, the corresponding thiazole 2 or 5 carboxylic acid is obtained.

When the above procedure is repeated using bromine in place of chlorine as the halogenating agent similar results are obtained.

EXAMPLE IX

*2-(4'-thiazolyl)-benzimidazole*

The following procedure is intended to be illustrative of a general method for converting the carboxylic acids of the present invention to compounds having anthelmintic activity.

6.5 g. of thiazole-4-carboxylic acid is stirred with 5.9 g. of thionyl chloride in 20 ml. xylene for 10 hours at room temperature to form 4-thiazolyl acid chloride. 1.3 g. of 4-thiazolyl acid chloride and 1.3 g. of o-nitroaniline are then stirred together in 3.5 ml. of pyridine at room temperature for about 12 hours. At the end of this time, the mixture is quenched in ice water and the solid nitroanilide recovered by filtration and washed with dilute sodium carbonate solution. The solid is suspended in 15 ml. of glacial acetic acid, and 8 ml. of 6-N-hydrochloric acid added to the suspension. 6 g. of zinc dust is added in small portions to the acetic mixture. After the zinc addition is complete, and the reaction is essentially finished (by visual observation), the reaction mixture is filtered and the filtrate neutralized with concentrated ammonium hydroxide to precipitate 2-(4'-thiazolyl)-benzimidazole. The product is purified by recrystallization from ethyl acetate.

Any departure from the above description which conforms to the present invention is intended to be included within the scope of the appended claims.

What is claimed is:

1. The method for producing a thiazole carboxylic acid from the corresponding halomethylthiazole which comprises treating a monohalomethylthiazole with an acid selected from the group consisting of sulfuric acid, phosphoric acid, hydrochloric acid and hydrobromic acid in an aqueous medium, wherein the amount of acid used when the halogen acids are employed is less than 4 moles per mole of said thiazole, to form a hydroxymethylthiazole, and contacting said hydroxymethylthiazole with a mixture of nitric acid and sulfuric acid.

2. The method for producing thiazole-4-carboxylic acid which comprises contacting a compound selected from the group consisting of 4-chloromethylthiazole and 4-bromomethylthiazole with an acid selected from the group consisting of sulfuric acid, phosphoric acid, hydrochloric acid and hydrobromic acid in an aqueous medium, wherein the amount of acid used when halogen acids are employed is between 0.1 and 4 moles per mole of the thiazole compound and at least 0.1 mole of acid per mole of the thiazole compound when sulfuric acid and phosphoric acid is used, to form 4-hydroxymethylthiazole, and treating the resulting 4-hydroxymethylthiazole with a mixture of nitric acid and sulfuric acid.

3. The method for producing thiazole-2-carboxylic acid which comprises contacting a compound selected from the group consisting of 2-chloromethylthiazole and 2-bromomethylthiazole with an acid selected from the group consisting of sulfuric acid, phosphoric acid, hydrochloric acid and hydrobromic acid in an aqueous medium wherein the amount of acid used when halogen acids are employed is between 0.1 and 4 moles per mole of the thiazole compound and at least 0.1 mole of acid per mole of the thiazole compound when sulfuric acid and phosphoric acid is used, to form 2-hydroxymethylthiazole, and treating the resulting 2-hydroxymethylthiazole with a mixture of nitric acid and sulfuric acid.

4. The method for producing a thiazole carboxylic acid from a dihalomethylthiazole which comprises contacting a dihalomethylthiazole with an acid selected from the group consisting of sulfuric acid and phosphoric acid in an aqueous medium while concurrently separately the halogen acid and thiazole aldehyde produced as a result of such contact, and treating said thiazole aldehyde with a mixture of sulfuric acid and nitric acid.

5. The method for producing thiazole-4-carboxylic acid which comprises contacting a compound selected from the group consisting of 4-dichloromethylthiazole and 4-dibromomethylthiazole with sulfuric acid in an aqueous medium while concurrently separating the halogen acid and thiazole-4-aldehyde produced as a result of such contact, and treating said aldehyde with a mixture of nitric and sulfuric acid.

6. The method for producing thiazole-2-carboxylic acid which comprises contacting a compound selected from the group consisting of 2-dichloromethylthiazole and 2-dibromomethylthiazole with sulfuric acid in an aqueous medium while concurrently separating the halogen acid and thiazole-2-aldehyde produced as a result of such contact, and contacting said aldehyde with a mixture of nitric acid and sulfuric acid.

7. The method for producing a thiazole-carboxylic acid which comprises contacting a compound selected from the group consisting of hydroxymethylthiazoles, and thiazole-aldehydes with a mixture of nitric acid and sulfuric acid.

References Cited by the Examiner

Elderfield, "Heterocyclic Compounds," Vol. 5, p. 626 (1957).

Groggins, Unit Processes in Organic Chemistry (New York, 1958), pages 497–8.

Huntress et al., Jour. Amer. Chem. Soc., Vol. 65, pp. 1667–1670 (1943).

Wagner et al., Synthetic Organic Chemistry (New York, 1953), pages 170–1, 285, and 419–22.

ALEX MAZEL, *Primary Examiner.*

DUVAL T. McCUTCHEN, JOHN D. RANDOLPH,
*Examiners.*

ALTON D. ROLLINS, *Assistant Examiner.*